United States Patent
Saito et al.

(10) Patent No.: US 8,970,722 B2
(45) Date of Patent: Mar. 3, 2015

(54) IMAGE PROCESSING APPARATUS AND METHOD OF CONTROLLING THE SAME

(75) Inventors: Mitsuhiro Saito, Yokohama (JP); Ken Terasawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 413 days.

(21) Appl. No.: 13/415,393

(22) Filed: Mar. 8, 2012

(65) Prior Publication Data

US 2012/0249844 A1 Oct. 4, 2012

(30) Foreign Application Priority Data

Mar. 28, 2011 (JP) ................ 2011-070396

(51) Int. Cl.
*H04N 5/228* (2006.01)
*H04N 5/238* (2006.01)

(52) U.S. Cl.
USPC ...................... 348/222.1; 348/367

(58) Field of Classification Search
CPC ............... H04N 5/2625; H04N 7/188
USPC ............... 348/222.1, 367
See application file for complete search history.

(56) References Cited

U.S. PATENT DOCUMENTS

2007/0206246 A1* 9/2007 Tsuruoka et al. ............. 358/521

FOREIGN PATENT DOCUMENTS

| CN | 1017135032 A | 6/2010 |
|---|---|---|
| JP | 2003-046848 | 2/2003 |
| JP | 2003-046857 | 2/2003 |
| WO | 2005/104035 A | 11/2005 |

OTHER PUBLICATIONS

The above foreign patent documents were cited in a Oct. 10, 2014 Chinese Office Action, a copy of which is enclosed with an English Translation, that issued in Chinese Patent Application No. 201210086746.X.

* cited by examiner

*Primary Examiner* — Christopher K Peterson
(74) *Attorney, Agent, or Firm* — Cowan, Liebowitz & Latman, P.C.

(57) ABSTRACT

An image processing apparatus such as a digital camera and a method of controlling the same is provided. In one embodiment, the digital camera generates an HDR image by combining two of a plurality of images to be combined for normal HDR processing. Before image combining operation, the digital camera converts the tone characteristics of at least one of the two images so as to assign more tone values to a tone area of an entire tone area of the HDR image which is not properly covered by either of the two images than before conversion.

15 Claims, 7 Drawing Sheets

F I G. 8A
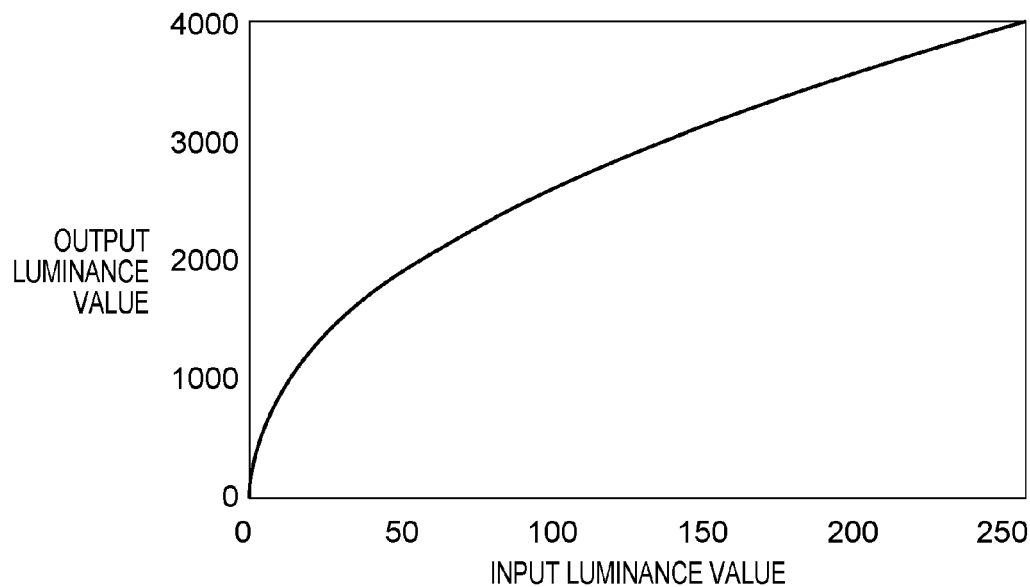
F I G. 8B
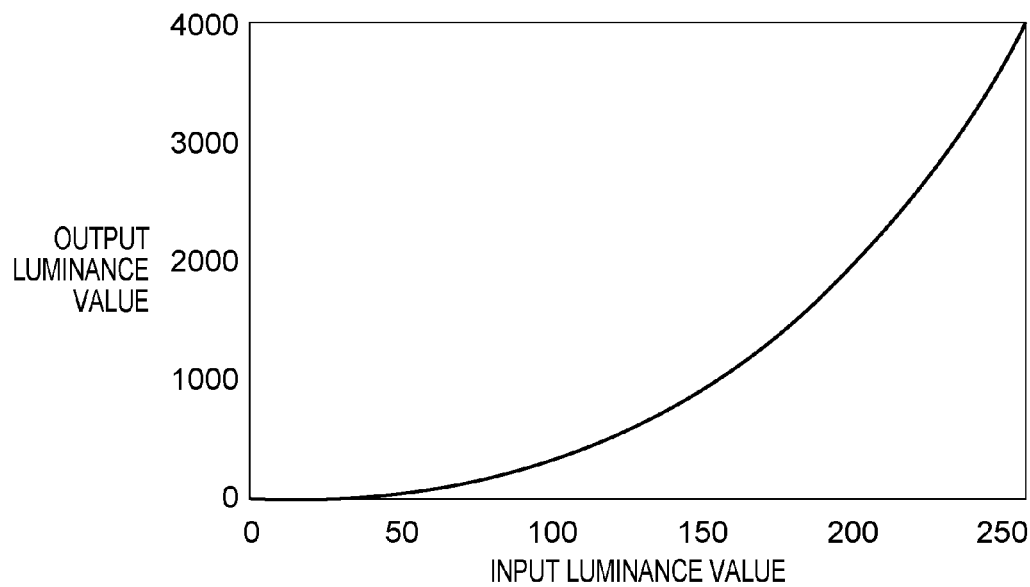

IMAGE PROCESSING APPARATUS AND METHOD OF CONTROLLING THE SAME

BACKGROUND OF THE INVENTION

1. Field of the Invention

The present invention relates to an image processing apparatus and a method of controlling the same.

2. Description of the Related Art

In capturing operation using a capturing apparatus such as a digital still camera or digital video camera, when a scene with large brightness differences is captured, highlight detail loss may occur in a bright portion, and shadow detail loss in a dark portion. As a method of correcting such highlight detail loss and shadow detail loss, there is available a method of generating a high dynamic range image in which bright and dark portions are properly reproduced, by capturing a plurality of images with different exposure amounts, and combining an area without any highlight detail loss with an area without any shadow detail loss in the respective images.

The capturing apparatus disclosed in Japanese Patent Laid-Open No. 2003-046848 can perform capturing while switching between the moving and still image modes. This apparatus generates tone characteristic information by estimating a capturing state from an image having undergone high dynamic range processing, and controls tone characteristics at the time of image reproduction. The capturing apparatus disclosed in Japanese Patent Laid-Open No. 2003-046857 alternately performs long-time capturing and short-time capturing and switches to high dynamic range processing corresponding to the current exposure time. This capturing apparatus also switches combining two images and combining three images in accordance with the degree of similarity to the current frame.

In general, the larger the number of images to be combined with different exposure amounts, the higher the effect of high dynamic range processing. However, the processing requires a long time. Therefore, applying a high dynamic range processing to a moving image or live view image will lead to a decrease in frame rate as the number of images to be combined increases. However, decreasing the number of images to be combined to suppress a decrease in frame rate will lead to large differences in the effect of high dynamic range processing between a preview image and a still image to be recorded which is generated from many images to be combined. It is therefore difficult for the user to check, through a moving image or preview image, the effect of high dynamic range processing in advance for a still image to be recorded.

As described above, various kinds of high dynamic range processing techniques have been proposed. However, neither of the techniques disclosed in Japanese Patent Laid-Open Nos. 2003-046848 and 2003-046857 has proposed any solution for the above problem. In addition, since the capturing apparatus disclosed in Japanese Patent Laid-Open No. 2003-046848 controls tone characteristics at the time of reproduction, a preview image and a reproduced image differ in the effect of high dynamic range processing. Furthermore, the capturing apparatus disclosed in Japanese Patent Laid-Open No. 2003-046857 changes the number of images to be combined and used for high dynamic range processing based on the degree of similarity with respect to motion, and hence it is necessary to prepare resources to always allow processing with the maximum number of images to be combined.

SUMMARY OF THE INVENTION

The present invention has been made in consideration of such a situation, and provides a technique of approximating the effect of high dynamic range processing using a small number of images to be combined to that of high dynamic range processing using a large number of images to be combined.

According to a first aspect of the present invention, there is provided an image processing apparatus including a generation unit which is capable of generating a high dynamic range (HDR) image by combining N (N is an integer not less than three) images captured by a capturing unit with N different exposure values, the apparatus comprising: a capturing control unit configured to cause the capturing unit to capture two images with two different exposure values; a conversion unit configured to convert a tone characteristic of at least one of the two images; and a generation control unit configured to cause the generation unit to combine the two images, the tone characteristic of at least one of which has been converted by the conversion unit, wherein the conversion unit converts a tone characteristic of at least one of the two images, based on the N exposure values and the two exposure values of the two images, such that a tone characteristic of an HDR image generated from the two images is approximated to a tone characteristic of an HDR image generated from the N images.

According to a second aspect of the present invention, there is provided an image processing apparatus including a generation unit which is capable of generating a high dynamic range (HDR) image by combining N (N is an integer not less than three) images captured by a capturing unit with N different exposure values, the apparatus comprising: a capturing control unit configured to cause the capturing unit to capture two images with two exposure values of the N exposure values; a conversion unit configured to convert a tone characteristic of at least one of the two images; and a generation control unit configured to cause the generation unit to combine the two images, the tone characteristic of at least one of which has been converted by the conversion unit, wherein the conversion unit converts a tone characteristic of at least one of the two images such that: a tone area, of an entire tone area of an HDR image generated from the N images, which is not covered by either (a) a tone area, of a low-exposure image as one of the two images which exhibits a smaller exposure, whose tone values are not less than a first threshold, or (b) a tone area, of a high-exposure image as one of the two images which exhibits a larger exposure, whose tone values are not more than a second threshold, is assigned with more tone values than before conversion.

According to a third aspect of the present invention, there is provided a method of controlling an image processing apparatus including a generation unit which is capable of generating a high dynamic range (HDR) image by combining N (N is an integer not less than three) images captured by a capturing unit with N different exposure values, the method comprising: a capturing control step of causing the capturing unit to capture two images with two different exposure values; a conversion step of converting a tone characteristic of at least one of the two images; and a generation control step of causing the generation unit to combine the two images, the tone characteristic of at least one of which has been converted in the conversion step, wherein in the conversion step, a tone characteristic of at least one of the two images is converted, based on the N exposure values and the two exposure values of the two images, such that a tone characteristic of an HDR image generated from the two images is approximated to a tone characteristic of an HDR image generated from the N images.

According to a fourth aspect of the present invention, there is provided a method of controlling an image processing apparatus including a generation unit which is capable of generating a high dynamic range (HDR) image by combining N (N is an integer not less than three) images captured by a capturing unit with N different exposure values, the method comprising: a capturing control step of causing the capturing unit to capture two images with two exposure values of the N exposure values; a conversion step of converting a tone characteristic of at least one of the two images; and a generation control step of causing the generation unit to combine the two images, the tone characteristic of at least one of which has been converted in the conversion step, wherein in the conversion step, a tone characteristic of at least one of the two images is converted such that: a tone area, of an entire tone area of an HDR image generated from the N images, which is not covered by either (a) a tone area, of a low-exposure image as one of the two images which exhibits a smaller exposure, whose tone values are not less than a first threshold, or (b) a tone area, of a high-exposure image as one of the two images which exhibits a larger exposure, whose tone values are not more than a second threshold, is assigned with more tone values than before conversion.

With the above arrangement, according to the present invention, it is possible to approximate the effect of high dynamic range processing using a small number of images to be combined to that of high dynamic range processing using a large number of images to be combined.

Further features of the present invention will become apparent from the following description of exemplary embodiments with reference to the attached drawings.

BRIEF DESCRIPTION OF THE DRAWINGS

FIG. 8A is a conceptual view of the tone mapping of assigning more tone values to a black tone area;

FIG. 8B is a conceptual view of the tone mapping of assigning more tone values to a white tone area.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

First Embodiment

Figure 1:
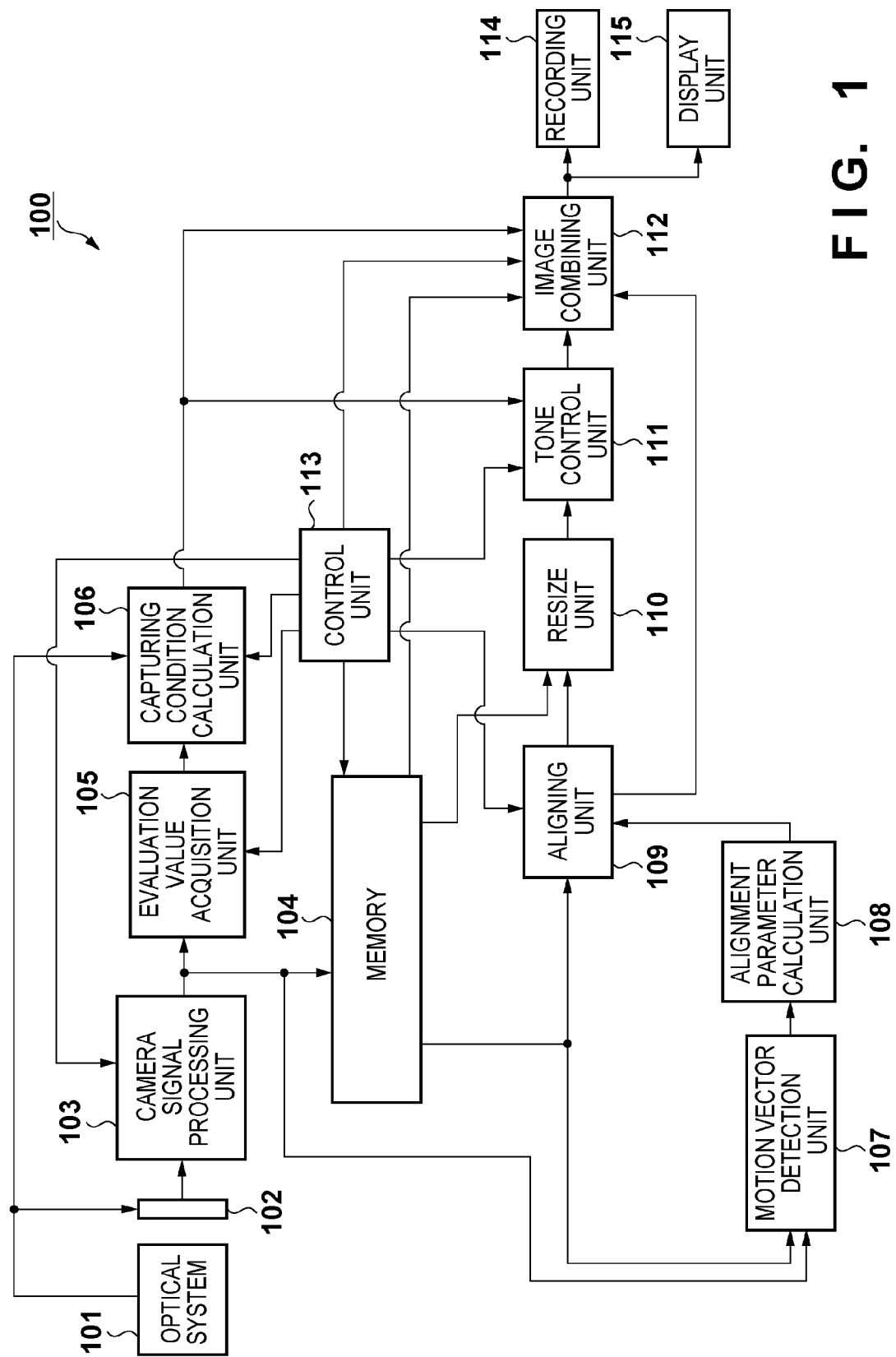
FIG. 1 is a block diagram showing the arrangement of a digital camera 100 according to the first embodiment.

An embodiment in which an image processing apparatus according to the present invention is applied to a digital camera. FIG. 1 is a block diagram showing the arrangement of a digital camera 100 according to the first embodiment. The digital camera 100 includes an optical system 101 which forms an object image and an image sensor 102 such as a CCD sensor or CMOS sensor which photoelectrically converts the image object formed by the optical system 101. The digital camera 100 also includes a camera signal processing unit 103 which forms a video signal from the electrical signal output from the image sensor 102. The camera signal processing unit 103 includes an A/D conversion unit, auto gain control unit (AGC), and auto white balance unit (none of which are shown), and forms a digital signal. The image sensor 102 and the camera signal processing unit 103 constitute a capturing system which acquires (captures) an image.

The digital camera 100 includes a memory 104. The memory 104 temporarily stores and holds image data, of the video signal formed by the camera signal processing unit 103, which corresponds to one field or a plurality of fields. The digital camera 100 also includes an evaluation value acquisition unit 105 which evaluates, for example, a highlight detail loss amount or shadow detail loss amount with respect to an input image.

The digital camera 100 also includes a capturing condition calculation unit 106 which calculates capturing conditions for images to be used for still image combining in accordance with the image evaluation values obtained from the evaluation value acquisition unit 105. In addition, the digital camera 100 includes a motion vector detection unit 107 which detects moving amounts (motion vectors) of a plurality of coordinates between two images to be combined which have a time difference.

The digital camera 100 includes an alignment parameter calculation unit 108 which calculates the misalignment amount between images to be combined, as an image deformation amount, based on the motion vectors detected by the motion vector detection unit 107. The digital camera 100 also includes an aligning unit 109. The aligning unit 109 performs image geometric transformation processing for alignment between the images by using the image deformation amount calculated by the alignment parameter calculation unit 108.

The digital camera 100 includes a tone control unit 111. The tone control unit 111 performs tone correction of images to be combined, which are used for high dynamic range processing (to be referred to as "HDR processing" hereinafter), by performing tone mapping processing or the like for the images to be combined based on the capturing parameters obtained by the capturing condition calculation unit 106.

The digital camera 100 includes an image combining unit 112. The image combining unit 112 generates a high dynamic range image (to be referred to as an "HDR image" hereinafter) by combining a plurality of images to be combined which have undergone alignment by the aligning unit 109. The image combining unit 112 generates a high-resolution HDR image for still image recording by combining N images captured with different N (N is an integer of three or more) exposure values. The image combining unit 112 can also generate an HDR image for live view display by combining two images captured with two of the N exposure values. HDR processing for still image recording and HDR processing for live view display will be also referred to as "normal HDR processing" and "simple HDR processing", respectively. A control unit 113 (to be described later) controls the aligning unit 109 and the memory 104 to change the path depending on whether to perform simple HDR processing for live view display or perform normal HDR processing for still image recording. When performing simple HDR processing, a resize unit 110 resizes first a low-exposure image and a high-exposure image to a size suitable for display on a display medium. The tone control unit 111 then performs tone mapping (to be described later) to output the resultant data to the image combining unit 112. When performing normal HDR processing, a low-exposure image and a high-exposure image are sent to the image combining unit 112 without via the resize unit 110 and the tone control unit 111. In this embodiment, the effect of normal HDR processing becomes higher with an increase in the number of images to be combined as compared with simple HDR processing, and hence N is set to three or more. However, the image combining unit 112 may perform normal HDR processing by using two images. In addition, in the embodiment, simple HDR processing is implemented by using two images. However, the number of images to be used for simple HDR processing is not specifically limited as long as it is smaller than that used for normal HDR processing.

The digital camera 100 also includes the control unit 113. For example, the control unit 113 issues instructions to the respective units of the digital camera 100 and performs computation necessary for processing by each unit. FIG. 1 (arrows) shows the relationship of control between the blocks associated with operation characteristic to this embodiment. The control unit 113 is in charge of other blocks.

The digital camera 100 also includes a recording unit 114. The recording unit 114 compresses the composite image data output from the image combining unit 112 in a predetermined compression format, and records the resultant data on a recording medium. The recording medium to be used may be a memory mounted in the apparatus or a detachable memory.

The digital camera 100 also includes a display unit 115. The display unit 115 displays the composite image data output from the image combining unit 112 on a display unit. As this display unit, it is possible to use a display medium such as a liquid crystal display incorporated in the camera or an external monitor or the like to display the above composite image data.

Figure 2:
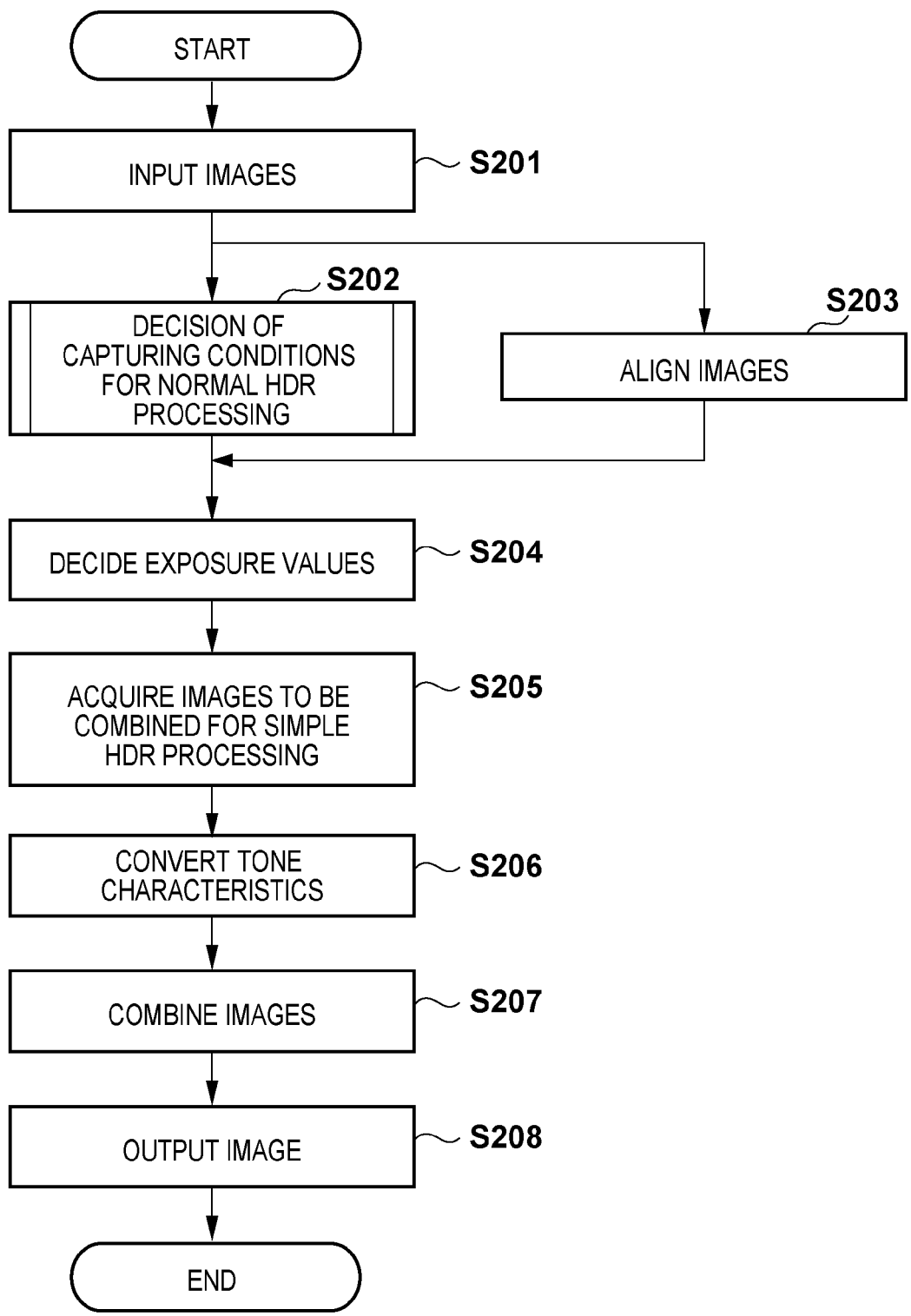
FIG. 2 is a flowchart showing a procedure for simple HDR processing executed by the digital camera 100 according to the first embodiment.

FIG. 2 is a flowchart showing a procedure for simple HDR processing executed by the digital camera 100 according to the first embodiment. Since simple HDR processing and normal HDR processing have common points, normal HDR processing will be also described partly.

(Step S201: Image Input)

In step S201, the image sensor 102 outputs the object image formed by the optical system 101 as an analog signal corresponding to the object luminance. The camera signal processing unit 103 generates, for example, a 12-bit digital signal by A/D-converting the output analog signal. The camera signal processing unit 103 further performs AGC processing and AWB processing for the digital signal to generate a digital video signal having undergone signal level correction and white level correction, and records the resultant data on the memory 104. The digital camera 100 in this embodiment sequentially generates field images at a predetermined frame rate. The evaluation value acquisition unit 105 and the motion vector detection unit 107 also receive the field images recorded on the memory 104. The field images recorded on the memory 104 are sequentially updated.

HDR processing based on image combining operation requires a plurality of images with different exposure amounts (captured with different exposure values). When performing moving image capturing operation or live view display, the digital camera 100 repeatedly captures images under at least two kinds of exposure conditions, that is, a low exposure value and a high exposure value, to perform simple HDR processing. On the other hand, when performing still image recording or still image recording during moving image capturing operation, the digital camera 100 continuously performs capturing under three or more kinds of exposure conditions (may perform capturing under two kinds of exposure conditions as described above) in order to perform high-precision HDR processing (normal HDR processing). Capturing conditions such as "three or more types of exposure conditions" are determined in step S202.

(Step S202: Decision of Capturing Conditions)

In step S202, the digital camera 100 calculates capturing conditions (especially, the number of images to be combined and exposure values for the respective images to be combined) for normal HDR processing by evaluating the input images. The reason why the digital camera 100 calculates capturing conditions for normal HDR processing instead of simple HDR processing is that it is necessary to know the contents of normal HDR processing as a premise in order to approximate the effect of simple HDR processing to that of normal HDR processing. In order to implement simple HDR processing in moving image display or live view display, it is necessary to perform this capturing condition decision processing at a predetermined period to update the capturing conditions. In addition, to implement simple HDR processing in quick review display after still image capturing operation, the capturing condition decision processing is performed at a point in time such as a half-press of the release switch at the time of still image capturing operation.

Figure 3:
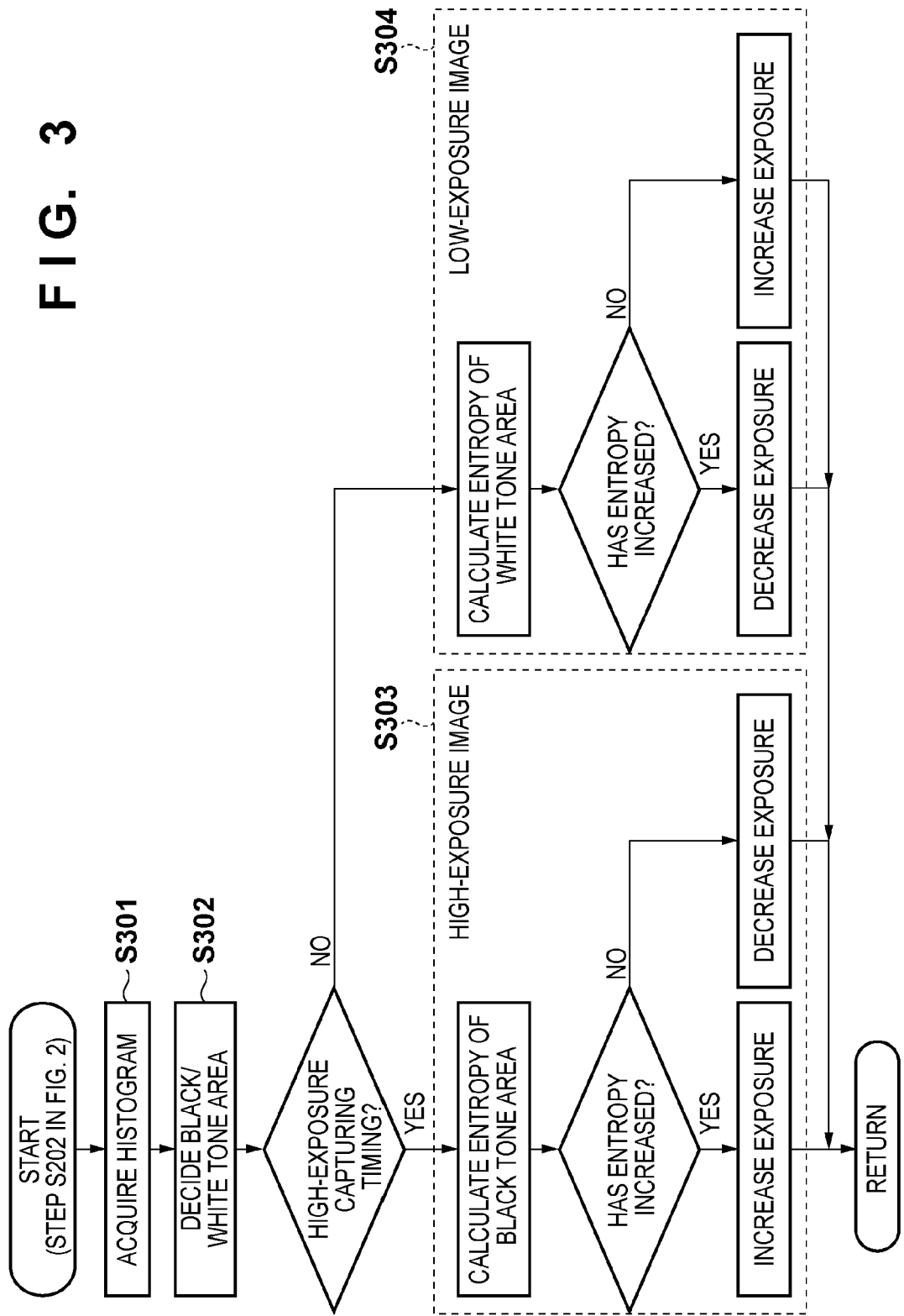
FIG. 3 is a flowchart showing a procedure for the processing of calculating capturing conditions for an image for normal HDR processing.

FIG. 3 is a flowchart showing a procedure for the processing of calculating capturing conditions for images for normal HDR processing. The evaluation value acquisition unit 105 alternately receives a high-exposure image and a low-exposure image via the image sensor 102 and the camera signal processing unit 103, as described above. In this embodiment, as an example of a method of evaluating images for the decision of capturing conditions, a method using the luminance distributions of black and white tone areas obtained from the luminance value histograms of images will be described.

Figure 4:
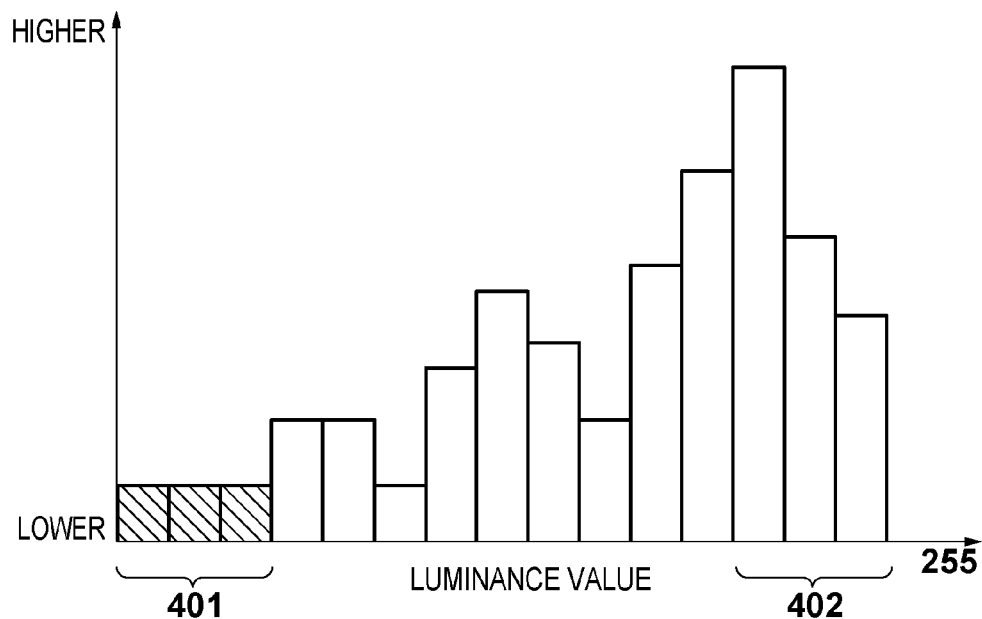
FIG. 4 is a graph showing an example of the luminance value histogram of an input image.

First of all, in step S301, the evaluation value acquisition unit 105 generates the luminance value histogram of each image input in step S201. FIG. 4 shows an example of the luminance value histogram of the input image. Referring to FIG. 4, the horizontal axis represents luminance value. In this case, the luminance values range from 0 to 255, assuming that the color depth is 8 bits. In addition, the vertical axis represents the appearance frequency of each luminance value to indicate how many pixels having each luminance value exist in the image. Referring to FIG. 4, pixels near a luminance value of 0 are those in a black area in the image, that is, an area including shadow detail loss, whereas pixels existing near a luminance value of 255 are those in a white area in the image, that is, an area including highlight detail loss.

In step S302, the evaluation value acquisition unit 105 decides tones which can be regarded as including shadow detail loss and highlight detail loss in the histogram acquired in step S301, and determines the distributions of luminance values in the black tone area and white tone area in the image.

When, for example, determining the luminance distribution of the black tone area in the image from the histogram in FIG. 4, the evaluation value acquisition unit 105 sets a tone range which can be regarded as the black tone area denoted by reference numeral 401, and determines the distribution state of luminance values existing in the range. Likewise, when determining a white tone area in the image, the evaluation value acquisition unit 105 sets a tone range which can be regarded as the white tone area denoted by reference numeral 402, and determines the distribution state of luminance values existing in the range. A method of deciding the ranges of tones denoted by reference numerals 401 and 402 is not specifically limited. It is possible to subjectively decide such a range by referring to the actual image or set such a range as the ratio of a luminance value range, for example, 10% of the range which the luminance values can take. The ranges 401 and 402 set in the above manner include luminance values to be improved by HDR processing. That is, if an input image is a high-exposure image, even the pixels in the range 401, which is the shadow detail loss area in a correct exposure image, can obtain proper texture. This area is used at the time of combining. Likewise, if an input image is a low-exposure image, the range 402 is an area to be used for the improvement of highlight detail loss.

This embodiment has exemplified the technique of obtaining the evaluation values of images by using luminance value histograms. However, the technique to be used is not specifically limited. For example, it is possible to use a technique using the luminance values of a main object area or the variance value of the luminance values of the overall image. Alternatively, it is possible to use the value of a photometric unit mounted in the digital camera 100.

The processing in the flowchart of FIG. 3 branches after step S302 depending on whether the current capturing timing is the timing of high-exposure capture. If the current timing is the timing of a high-exposure capture, the process advances to step S303. Otherwise (in the case of low-exposure capturing), the process advances to step S304. In steps S303 and S304, the capturing condition calculation unit 106 decides capturing conditions for images to be combined which are used for HDR processing, based on the luminance distributions of the black tone area and white tone area decided from the luminance value histograms.

Figure 5:
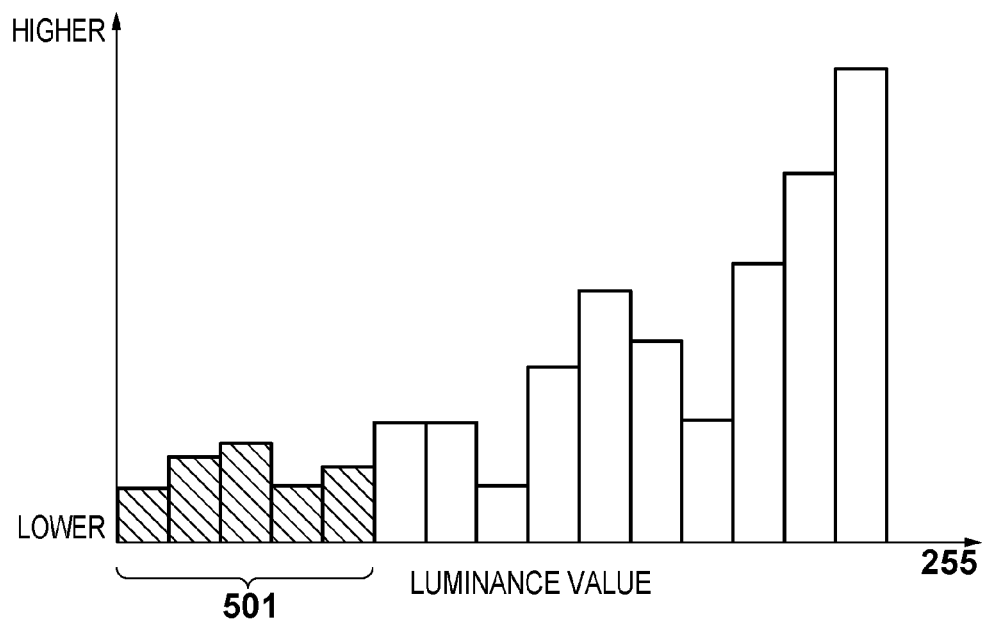
FIG. 5 is a graph showing an example of the luminance value histogram of a high-exposure image.

A method of deciding an exposure amount (exposure value) as a capturing condition for each image to be combined will be described below by exemplifying the processing in step S303. FIG. 5 shows an example of the luminance value histogram of the image captured at an exposure level higher than that of the image in FIG. 4. Since the image is captured at a high exposure level, the black tone area denoted by reference numeral 401 in FIG. 4 has luminance values in a wider range as denoted by reference numeral 501 in FIG. 5. The capturing condition calculation unit 106 calculates the entropy of the luminance distribution of the black tone area 501 to determine whether the exposure amount is proper for a high-exposure image. In this case, entropy is a numerical value indicating the degree of averaging of given data. The larger the entropy, the larger the variation of the data, and vice versa. The following are equations for calculating an entropy Eg of the luminance values in an image:

$$Eg = \sum_{i=0}^{255} (-p_i \log(p_i)) \quad (1)$$

$$p_i = \frac{n_i}{n}$$

In Equation (1), n is the total number of pixels in a black tone area, and $n_i$ is the number of pixels with a luminance value i in the black tone area. If, therefore, the value of the entropy of a luminance distribution obtained by Equation (1) is larger than the value of the entropy in the preceding high-exposure image, the luminance variation in the black tone area has increased, as denoted by reference numeral 501 in FIG. 5. It is therefore possible to determine that the shadow detail loss area in which the luminance value variation is small has decreased. It can be thought that it is possible to further suppress shadow detail loss in the next high-exposure frame as compared with the current frame by performing capturing with a higher exposure amount. Increasing the exposure amount too much will increase the brightness of the overall image. This will decrease the entropy of the black tone area. For this reason, it is thought that if the capturing condition calculation unit 106 determines in step S303 that the entropy has decreased, since it is thought that the shadow detail loss amount has increased, the camera performs capturing in the next high-exposure frame upon decreasing the exposure amount. Since the camera repeatedly executes the processing in flowchart of FIG. 3 (the processing in step S202 in FIG. 2), the camera repeatedly executes the processing in step S303. Finally, the exposure amount of a high-exposure image converges to an optimal value (an exposure amount that maximizes the entropy of a black tone area).

As described above, it is possible to capture a proper high-exposure image by comparing the entropy of a black tone area in a currently captured high-exposure image with that in a previously captured high-exposure image and controlling the exposure amount in a direction to maximize the entropy. Although this applies to a case in which the low-exposure image shown in step S304 is input, the exposure amount is controlled focusing on highlight detail loss in a low-exposure image. In addition, it is possible to control the exposure amount by changing capturing parameters such as an aperture and shutter speed. That is, parameters to be used are not specifically limited as long as they can change the exposure amount.

Figure 6A:
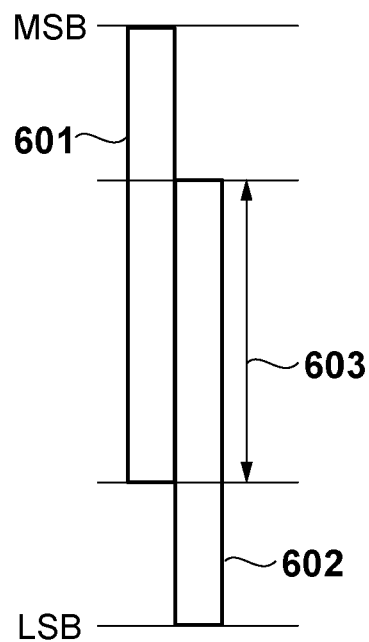
FIG. 6A is a conceptual view of HDR processing based on two images to be combined which have a small exposure level difference.

The method of controlling the exposure amount has been described so far. However, in addition to this condition, as a capturing condition for capturing images to be combined, the number of images to be captured needs to be determined. Consider first a case in which the difference between the exposure level for a low-exposure image and that for a high-exposure image which are decided in the above exposure amount control, is small, for example, the exposure level for the low-exposure image is lower than that for correct exposure as a reference by one, and the exposure level for the high-exposure image is higher than that for correction exposure by one. FIG. 6A schematically shows the relationship between the dynamic range of an HDR image and that of each of two images to be combined which have a small exposure level difference when HDR processing is performed by using the images. FIG. 6A shows the tones of the images in the vertical direction, with LSB (Least Significant Bit) representing the minimum luminance value of the HDR image, and MSB (Most Significant Bit) representing the maximum luminance value. Reference numeral 601 denotes the dynamic range of the luminance values of the low-exposure image, which has a white tone area without any highlight detail loss; 602, the dynamic range of the luminance values of the high-exposure image, which has a black tone area without any shadow detail loss; and 603, an intermediate tone area in the HDR image. Note that the dynamic ranges of the low-exposure image 601 and high-exposure image 602 shown in FIG.

6A are those which have undergone level matching between luminance values in advance, as will be described in detail below.

The low-exposure image 601 and the high-exposure image 602 cannot be combined without any changes from the captured states because of the differences between output luminance values even with the same light intensity due to the differences in input/output characteristics. For this reason, in order to perform level matching between the output luminance values of the two images, it is necessary to perform gain correction for either of the images. It is possible to obtain a gain correction value from the exposure level difference between the two images to be combined. If, for example, the exposure level difference between the low-exposure image 601 and the high-exposure image 602 is 1, the ratio of the light intensity of the high-exposure image to the low-exposure image is 2. Therefore, doubling the gain of the luminance value of each pixel of the low-exposure image 601 can achieve level matching with the luminance value of each pixel of the high-exposure image 602. This makes it possible to combine these images. The view of FIG. 6A generated in the above manner shows for which tones in the dynamic range of the HDR image after processing the respective images used for HDR processing are responsible.

In this case, if the exposure level difference is small, each image can cover tones corresponding to the intermediate tone area 603. It is therefore possible to generate a good HDR image by using the pixels of either or both of the two images. That is, it is possible to determine that the necessary number of images to be captured in FIG. 6A is two.

Figure 6B:
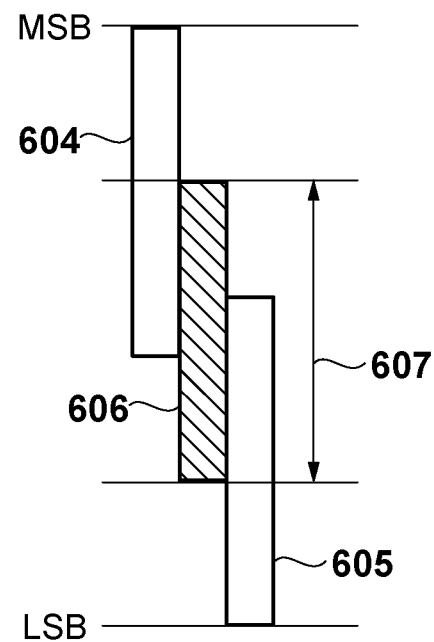
FIG. 6B is a conceptual view of HDR processing when the exposure level difference between a low-exposure image and a high-exposure image is large.

In contrast, FIG. 6B shows the relationship between the dynamic ranges in a case in which the difference between the exposure level for the low-exposure image and that for the high-exposure image is large, for example, the exposure level for the low-exposure image is lower than that for correct exposure as a reference by three, and the exposure level for the high-exposure image is higher than that for correction exposure by three. As shown in FIG. 6B, if the exposure level difference is large, both a low-exposure image 604 and a high-exposure image 605 cover smaller ranges of an intermediate tone area 607. In addition, many shadow detail losses have occurred in the black tone area of the low-exposure image 604, whereas many highlight detail losses have occurred in the white tone area of the high-exposure image 605. For this reason, even generating an HDR image by combining these images without any change will not properly reproduce the tonality of the intermediate tone area. In such a case, as denoted by reference numeral 606 in FIG. 6B, it is necessary to improve the reproducibility of intermediate tones by capturing an image with an intermediate exposure amount and using it for combining operation in addition to the two images, that is, the low-exposure image 604 and the high-exposure image 605. In the case shown in FIG. 6B, the necessary number of images to be captured is determined to be three. In practice, however, the number of images to be used for combining operation is not specifically limited, and it is possible to capture a larger number of images. In addition, the method of deciding the number of images to be captured is not specifically limited, and it is possible to automatically calculate the number of images to be captured from an exposure level difference or to use a method of making the user manually designate the number of images to be captured.

When considering the actual operation of the digital camera 100, however, it is not necessary to always capture the number of images decided as a capturing condition, and it is possible to change the number of images to be captured in accordance with a capturing state. That is, when performing moving image capturing operation, live view display, or the like, it is possible to perform simple HDR processing by using a smaller number of images. In such a case, therefore, the digital camera 100 may capture two images upon selecting two of a plurality of exposure values decided as capturing conditions (for example, the maximum and minimum exposure values of a plurality of exposure values decided as capturing conditions to execute the processing in steps S303 and S304 in FIG. 3). When, for example, the user presses the shutter button to issue an instruction to the digital camera 100 to perform high-resolution HDR processing for still image recording, the digital camera 100 captures the number of images with exposure amounts which are decided as capturing conditions.

In the above manner, in step S202, capturing parameters (exposure amounts) and the number of images to be captured are decided as capturing conditions for images to be combined which are necessary for normal HDR processing. The digital camera 100 performs capturing in accordance with the decided information. The memory 104 then stores the captured images to be combined. The capturing condition information is transmitted to the tone control unit 111.

(Step S203: Image Alignment)

The camera executes the processing in step S203 concurrently with the processing in step S202 (may execute them serially). In step S203, the camera performs alignment between a plurality of images to be combined which are captured in step S202. If the digital camera 100 or the object has moved during capturing of images to be combined, a slight misalignment has occurred between the respective images to be combined. Due to this misalignment, combining the images in this state will cause blur in an object image as an HDR image. It is therefore necessary to detect the misalignment amount between the respective images to be combined and perform alignment upon geometrically transforming the images so as to cancel out the misalignment amount.

More specifically, first of all, the motion vector detection unit 107 obtains motion vectors between the images to be combined. In general, the motion vector detection unit 107 detects motion vectors based on the correlation in texture information of target pixels and their neighboring areas between two images. Target pixels may be arranged at equal intervals so as to cover the overall image, or may be set by extracting feature points on the edges, corners, and the like of textures. However, since the images to be combined are captured with different exposure amounts, the images differ in brightness as a whole in the state without any change. For this reason, the camera determines that even identical areas have a low correlation. It is therefore necessary to achieve level matching between the luminance values of the respective images to be combined before the detection of motion vectors.

Methods of performing level matching between luminance values include a method of performing gain adjustment based on capturing parameters at the time of image capturing and a method of performing normalization processing for all pixels. However, the present invention is not limited to these methods. In addition, as a method of detecting motion vectors, it is possible to use a general detection method such as a template matching method or gradient method. However, the methods which can be used are not specifically limited.

The alignment parameter calculation unit 108 then calculates misalignment amounts between the images to be combined, as image deformation amounts, by using the motion vectors calculated by the motion vector detection unit 107. This embodiment will exemplify a case in which the camera calculates image deformation amounts for alignment by using a homography model as an image deformation amount model.

Assume that a given point a $$a=[x,y,1]^T \quad (2)$$

existing on the first image of two images to be aligned has moved to a point a'

$$a'=[x',y',1]^T \quad (3)$$

on the second image. In this case, the relationship between the points $\underline{a}$ and a' can be represented by using a homography matrix H as follows:

$$a'=Ha \quad (4)$$

In this case, T in each of Equations (2) and (3) represents matrix transposition. The homography matrix H in Equation (4) is a determinant which represents the amounts of change in translation, rotation, scaling, shearing, or tilt between the images, and can be represented by $$H = \begin{bmatrix} h_{11} & h_{12} & h_{13} \\ h_{21} & h_{22} & h_{23} \\ h_{31} & h_{32} & 1 \end{bmatrix} \quad (5)$$

In addition, the points $\underline{a}$ and a' and the homography matrix H are expressed by homogeneous coordinates. The same applies to the following.

Each element of the homography matrix H can be calculated by using the motion vector group calculated by the motion vector detection unit 107, that is, the correspondence relationship between target points of images to be combined, and statistical processing such as the least squares method. The homography matrix H obtained in this manner represents the misalignment amounts between the images. In order to correct the misalignments, therefore, it is necessary to transform H into image deformation amounts that cancel out the misalignments. That is, letting K be the inverse matrix of the homography matrix H, $$a=Ka\alpha \quad (6)$$

Equation (6) allows to return the feature point a' after misalignment to the same coordinates as those of the feature point $\underline{a}$ misalignment. In this embodiment, K will be referred to as an alignment parameter.

This embodiment calculates the misalignment amount of the second image with reference to the first image. However, the present invention is not limited to this. It is possible to select a reference image for misalignment detection in accordance with a reference image for image combining operation. When, for example, capturing three images as images to be combined, calculating the misalignment amount of the third image with reference to the first image will obtain a larger misalignment amount than that between the first image and the second image because of the insertion of the second image between the first and third images. In general, the larger the misalignment amount between images, the larger the error in the calculated image deformation amount. For this reason, when combining three images, the calculation of a misalignment amount by using the second image as a reference image allows to calculate an image deformation amount with less error, leading to highly accurate alignment. In this way, a proper reference image for the calculation of a misalignment amount may be selected in accordance with the number of images to be used.

Subsequently, the image aligning unit 109 performs misalignment correction by performing image geometric transformation processing for all the pixels on the image using this alignment parameter. This embodiment uses a homography matrix as an image deformation amount representing a misalignment. In practice, however, the present invention is not limited to this, and it is possible to use other image deformation amounts such as a Helmert matrix or affine transformation matrix in accordance with the type of misalignment caused between the images.

(step S204: Exposure Value Decision)

In step S204, the capturing condition calculation unit 106 decides exposure values for images to be combined which are used for simple HDR processing. Assume that in this embodiment, the capturing condition calculation unit 106 selects the maximum and minimum values of the exposure values decided in step S202. In the case shown in FIG. 6B, the capturing condition calculation unit 106 selects exposure values for the low-exposure image 604 and the high-exposure image 605. In this case, in simple HDR processing, the camera generates an HDR image with the maximum and minimum exposure values of a plurality of exposure values used in normal HDR processing. The present invention is not limited to this. In order to realize tone characteristics similar to the tone characteristics of an HDR image generated with a plurality of exposure values used in normal HDR processing, it is possible to select other exposure values different from the plurality of exposure values. For example, when performing capturing with three exposure values in normal HDR processing, the camera decides two intermediate values including an intermediate value between the maximum exposure value and the appropriate exposure value and an intermediate value between the appropriate exposure value and the minimum exposure value as exposure values for simple HDR processing. This can generate a simple HDR image with higher reproducibility with respect to an intermediate area near the appropriate exposure value.

(Step S205: Acquisition of Images to be Combined for Simple HDR Processing)

In step S205, the capturing condition calculation unit 106 performs processing (capturing control) for the acquisition of images captured with the exposure values selected in step S204. More specifically, the capturing condition calculation unit 106 controls the optical system 101 and the image sensor 102 so as to capture images with the exposure values decided in step S204.

(Step S206: Tone Characteristic Conversion)

In step S206, the tone control unit 111 approximates the tone expression (tone characteristics) of a simple HDR image used for live view or the like to that of a normal HDR image for still image recording by performing tone control processing for the images to be combined. Normal HDR processing at the time of still image recording ideally reproduces tone expression equivalent to real-world expression in every tone area without any highlight detail loss or shadow detail loss. In addition, unlike live view display, still image recording is free from temporal restrictions such as a frame rate, and hence high-precision HDR processing is performed by capturing many images to be combined in spite of a slightly long processing time. In contrast to this, in simple HDR processing for live view described in this embodiment, since images are consecutively captured at a predetermined frame rate, high-precision HDR processing cannot catch up with display operation. For this reason, simple HDR processing for live view generates an HDR image in a simple manner by capturing two images with two arbitrary exposure values of a plurality of exposure values used for normal HDR processing for still image recording.

Figure 7A:
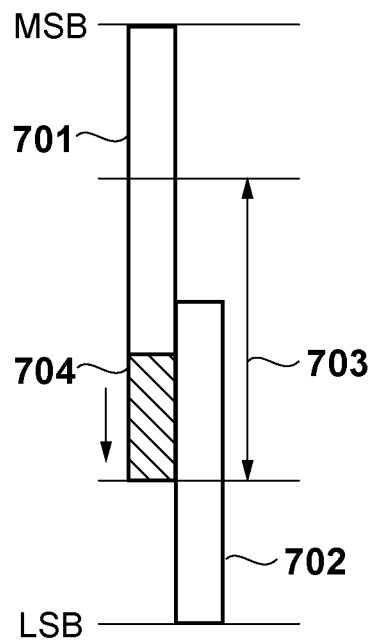
FIG. 7A is a view schematically showing the relationship between the dynamic range of each image to be combined in simple HDR processing and the dynamic range of an HDR image after processing.

FIG. 7A is a view schematically showing the relationship between the dynamic range of an HDR image after processing and that of each image to be combined in simple HDR processing. FIG. 7A shows a case in which the camera easily generates an HDR image by using two images including a low-exposure image 701 and a high-exposure image 702 for live view display, in contrast to the capturing condition stating that three images are combined for still image recording as shown in FIG. 6B. In this case, the range of an intermediate tone area 703 includes only the low-exposure image 701 including many shadow detail losses and the high-exposure image 702 including many highlight detail losses. For this reason, combining the images without any change will lead to mismatching between the intermediate tone area 703 and that of an actually recorded high-accuracy HDR image. This makes it difficult for the user to obtain an intended image even by performing capturing with reference to live view display.

This camera therefore obtains sufficient tones for the reproduction of the tones of the intermediate tone area 703 by performing tone control processing, as preprocessing for simple HDR processing, for each image to be combined. This embodiment will exemplify a method using tone mapping processing as a tone control method. Tone mapping processing is the processing of converting the tone characteristics of a given image into different tone characteristics. The following is an example of an equation for tone mapping.

$$O(x, y) = t\_out \left( \frac{I(x, y)}{t\_in} \right)^{\frac{1}{\gamma}} \quad (7)$$

In the above equation, I(x, y) represents the luminance value of a given pixel at coordinates (x, y) of an input image, t_in represents the maximum luminance value of the input image, t_out represents the maximum luminance value after tone mapping, and O(x, y) represents a luminance value at I(x, y) after tone mapping. Therefore, changing the value of t_out can compress, for example, a 12-bit image into an 8-bit image or expand a 12-bit image into a 14-bit image. In addition, γ is a coefficient for the adjustment of assignment of tone values after tone mapping. Increasing the value of γ to more than 1 will assign many tone values to a black tone area. This clarifies density differences in the black tone area after tone mapping, thereby suppressing shadow detail loss. In contrast, setting the value of γ to a value between 0 and 1 will assign many tone values to a white tone area. This clarifies the density differences in the white tone area, thereby suppressing highlight detail loss.

As an example of tone mapping, a case in which the camera expands the black tone area of the low-exposure image 701 will be described. Assume that in FIG. 7A, the dynamic range of an HDR image is 16 bits, and the dynamic range of the intermediate tone area 703 falls within the range from 4 bits to 12 bits. In this case, if the dynamic range of the low-exposure image 701 is 8 bits, the tones of the low-exposure image 701 are responsible for 8 bits to 16 bits of the HDR image in FIG. 7A. In this case, expanding the black tone area of the low-exposure image 701 as denoted by reference numeral 704 in FIG. 7A by performing tone mapping processing will make the tones of the low-exposure image 701 responsible for the range of 4 bits to 16 bits of the HDR image. Expressing the above operation by using Equation (7) can draw a graph like that shown in FIG. 8A.

Referring to FIG. 8A, the horizontal axis represents the luminance value of an original image; and the vertical axis, luminance value after tone mapping. As shown in FIG. 8A, finely assigning tones to a black tone area while enlarging the dynamic range of the image can obtain, in the intermediate tone area 703, an image which suppresses shadow detail loss while expanding the range of the black tone area. Therefore, using the low-exposure image 701 and the high-exposure image 702, which have undergone tone control processing, as images to be combined can approximate the intermediate tone expression of an HDR image obtained by simple HDR processing to that of an HDR image obtained by normal HDR processing at the time of still image recording.

The above description has been made on the case in which the black tone area of the low-exposure image 701 is expanded. However, there is available a method of obtaining intermediate tones for an HDR image by expanding the white tone area of the high-exposure image 702. However, the white tone area of the high-exposure image 702 is a highlight detail loss area, and hence luminance information may exceed the upper limit of the tones of the image and be lost. This limits the range in which the white tone area can be expanded, as compared with the low-luminance side of the low-exposure image 701.

As described above, methods of converting tone characteristics include various methods, for example, a method of expanding the black tone area of the low-exposure image 701 and a method of expanding the white tone area of the high-exposure image 702. Note that the following is important. When performing simple HDR processing by using only part of images to be combined for normal HDR processing (see FIG. 6B), as shown in FIG. 7A, a part of an entire tone area (between LSB and MSB) of the HDR image is not covered by any images to be combined. More specifically, the low-exposure image 701 covers part (a tone area with tone values greater than or equal to the first threshold) of an entire tone area of the low-exposure image 701 from which the black tone area is excluded. The high-exposure image 702 covers part (a tone area with tone values less than or equal to the second threshold) of an entire tone area of the high-exposure image 702 from which the white tone area is excluded. Therefore, the low-exposure image 701 and the high-exposure image 702 do not properly cover a tone area near the center of an entire tone area of the HDR image. The tone control unit 111 therefore converts the tone characteristics of at least one of the low-exposure image 701 and the high-exposure image 702 so as to assign more tone values to such a tone area than those before conversion. An example of such conversion of tone characteristics is the expansion of the black tone area of the low-exposure image 701 shown in FIG. 7A. In the actual operation of this embodiment, the camera generates a tone curve by deciding to use one of the above tone mapping methods based on N exposure values used for normal HDR processing and two exposure values used for simple HDR processing. Obviously, it is possible to select and use one of tone curves stored in advance instead of generating a tone curve for every operation.

Expanding a tone area by tone mapping will also expand noise components in a black tone area, in particular. For this reason, in this embodiment, when performing simple HDR processing, the tone control unit 111 suppresses enhanced noise components by applying noise suppression processing such as smoothing more strongly than processing for still image recording.

(Step S207: Image Combining)

Referring to FIG. 2, in step S207, the image combining unit 112 performs image combining (generation control) for the generation of an HDR image for live view display. An outline of image combining will be described with reference to FIG. 7A. FIG. 7A shows the range of the tones of an HDR image to be generated. In general, this range is set to be wider than the dynamic range of each input image to be combined. The low-exposure image 701 and the high-exposure image 702 as images to be combined are those which have undergone luminance value level matching between them by the aligning unit 109 and misalignment correction. In addition, at least one of the low-exposure image 701 and the high-exposure image 702 has undergone tone expansion (tone characteristic conversion) such as tone mapping processing by the tone control unit 111 in step S206.

Arranging the above images to be combined in consideration of the continuity of dynamic ranges will reveal which image has which tones of an HDR image, as shown in FIG. 7A. To generate an HDR image, therefore, the camera may decide from which image it will take pixels corresponding to the respective tones. The camera may use the following method of selecting luminance values. If only one image has a corresponding tone, the camera may use the image. Using the white tone area of the low-exposure image 701 for combining operation will suppress highlight detail loss. Using the black tone area of the high-exposure image 702 can also suppress shadow detail loss. As for the intermediate tone area 703, using the low-exposure image 701 whose black tone area has been expanded makes it possible to approximate the effect of single HDR processing to that of normal HDR processing. Deciding from which image pixels are to be used for all the tones in this manner can generate an HDR image in which both shadow detail loss and highlight detail loss are suppressed. Note that normal HDR processing is similar to simple HDR processing except for the execution/non-execution of tone control by the tone control unit 111 and the number of images to be combined (see FIG. 6B).

(Step S208: Image Output)

In step S208, the image combining unit 112 outputs the generated HDR image to a display apparatus or storage apparatus (not shown). In this case, the HDR image has an expanded dynamic range as compared with a normal image, and hence cannot be sometimes output to the display apparatus without any change. In such a case, tone mapping processing may be further performed for the HDR image to convert its dynamic range into a general dynamic range such as an 8-bit range.

As has been described above, according to this embodiment, the digital camera 100 generates an HDR image by combining two of a plurality of images to be combined for normal HDR processing. Before image combining operation, the digital camera 100 converts the tone characteristics of at least one of the two images so as to assign more tone values to a tone area of an entire tone area of the HDR image which is not properly covered by either of the two images than before conversion. This can suppress a decrease in frame rate by decreasing the number of images to be combined and approximate the effect of simple HDR processing to that of normal HDR processing. In addition, since the number of images to be combined decreases, it is possible to reduce the memory capacity required for HDR processing.

Second Embodiment

In the first embodiment, in step S204 in FIG. 2, the camera selects the maximum and minimum values of the exposure values decided in step S202. In this case, of an entire tone area of an HDR image generated by simple HDR processing, a tone area near the center and the other tone area differ in the degree of approximation to normal HDR processing. As is understood from the comparison between FIGS. 6B and 7A, due to approximation by tone characteristic conversion, the effect of simple HDR processing on the tone area near the center is approximated to the effect of normal HDR processing to some extent. However, the approximation causes an error in the effect. On the other hand, as is understood from the comparison between FIGS. 6B and 7A, since the remaining tone area require no approximation, even simple HDR processing produces almost the same effect as that of normal HDR processing.

In consideration of such characteristics of simple HDR processing, this embodiment changes exposure values to be selected and the contents of tone control depending on which tone area of an HDR image generated by simple HDR processing is a focus of attention.

Figure 9:
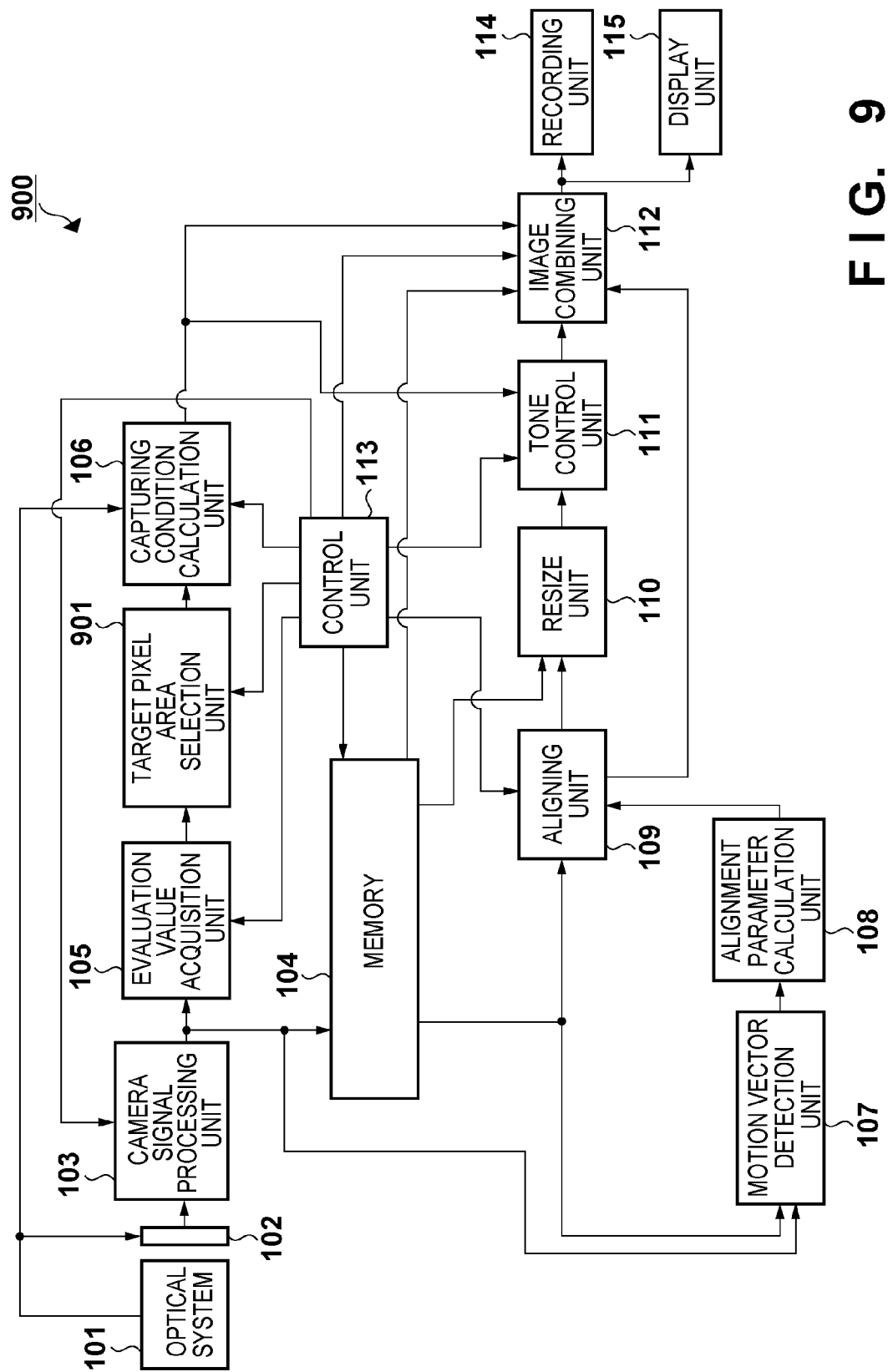
FIG. 9 is a block diagram showing the arrangement of a digital camera 900 according to the second embodiment.

FIG. 9 is a block diagram showing the arrangement of a digital camera 900 according to the second embodiment. The same reference numerals as in FIG. 9 denote the same or similar constituent elements in FIG. 1, and a description of them will be omitted. The digital camera 900 includes a target pixel area selection unit 901 in addition to the arrangement shown in FIG. 1. The following description will only refer to part of the processing in this embodiment which differs from the processing in the first embodiment in the flowchart shown in FIG. 2.

In step S204 in FIG. 2 in this embodiment, the camera selects exposure values upon designating a target image area in a preview image. Assume that the target pixel area selection unit 901 designates the face of an object, and the face image includes many intermediate tone pixels. In this case, the designation of the face by the target pixel area selection unit 901 can be regarded as the designation of a tone area (intermediate tone area), of an entire tone area of an HDR image, which is near the center.

The relationship between a target tone area and an exposure difference between images will be described below. In the combining method shown in FIG. 7A, as described above, tone mapping approximately achieves matching between an intermediate tone area and that of a high dynamic range image to be actually recorded, whereas the remaining tone area allow to obtain an image almost identical to the image to be recorded.

Figure 7B:
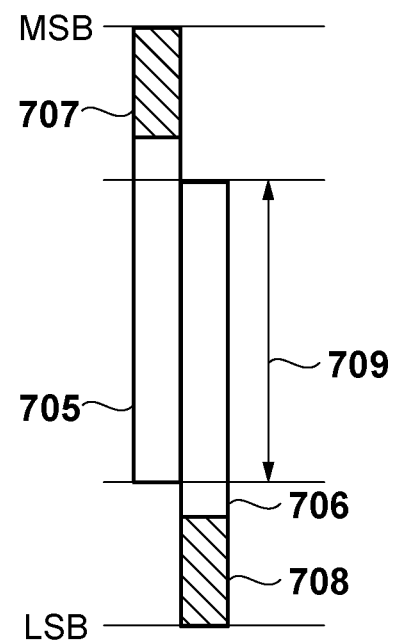
FIG. 7B is a conceptual view of simple HDR processing when an intermediate tone area is selected as a target tone area.

In contrast to this, FIG. 7B is a conceptual view of simple HDR processing when an intermediate tone area is selected as a target tone area. Referring to FIG. 7B, the range of an intermediate tone area 709 of an HDR image includes both the intermediate tone area of a low-exposure image 705 and the intermediate tone area of a high-exposure image 706, and hence the intermediate tone area allows to obtain an image almost identical to the image to be recorded. However, since any tone area of the image do not exist near LSB which is the minimum luminance value of the HDR image and MSB which is the maximum luminance value, it is not possible to improve shadow detail loss and highlight detail loss. It is therefore necessary to approximately achieve matching with such tone area by tone control processing.

As has been described above, images to be generated differ in tone reproducibility depending on the exposure differences between images to be used for simple HDR processing. For this reason, in this embodiment, when the user wants to know how shadow detail loss and highlight detail loss will be improved by simple HDR processing, a capturing condition calculation unit 106 selects two exposure values with a large difference in step S204. On the other hand, when the user wants to pay attention to the quality of an intermediate tone area, the capturing condition calculation unit 106 selects two exposure values with a small difference in step S204. As a method of selecting a target tone area, there is available a method of selecting a tone area included in a target image area by making the user manually designate the image area on a menu screen or the like. As another selection method, a target tone area may be selected based on the numbers of pixels included in a shadow detail loss area and a highlight detail loss area from the luminance value histogram generated by an evaluation value acquisition unit 105. In this case, the camera may automatically set an intermediate tone area as a target tone area, instead of making the user select it at his/her initiative, upon determining that a shadow detail loss area in an image is small when the number of pixels included in a black tone area is less than or equal to a predetermined threshold.

In step S206 in FIG. 2 in this embodiment, the camera performs tone control on the images captured with the exposure values selected in accordance with a target tone area. In this case, when attention is paid to improvements in shadow detail loss and highlight detail loss, that is, the exposure difference between images is large, the camera performs the same processing as that in FIG. 7A in the first embodiment. In contrast to this, when attention is paid to intermediate tones, that is, the exposure difference between images is small, the camera performs tone control as shown in FIG. 7B. That is, the camera expands the white tone area of the low-exposure image 705 as denoted by reference numeral 707 by tone mapping, and expands the black tone area of the high-exposure image 706 as denoted by reference numeral 708. At this time, the camera expands the white tone area by performing the tone mapping processing of assigning many tones to the white tone area as shown in FIG. 8B, and expands the black tone area by the same processing as that shown in FIG. 8A. This makes it possible to obtain an HDR image which has achieved matching with an actually recorded image even when the exposure difference between the images to be used for simple HDR processing is small.

As has been described above, according to this embodiment, the digital camera 900 selects exposure values for images to be used for simple HDR processing depending on which tone area of an HDR image generated by simple HDR processing is a focus of attention. As described with reference to FIGS. 7A and 7B, the digital camera 900 then performs tone control in accordance with the exposure difference between the two images captured with the selected exposure values. This makes it possible to obtain, by simple HDR processing, an HDR image which has achieved better matching with the HDR image obtained by normal HDR processing with respect to a tone area to which the user pays attention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-070396, filed on Mar. 28, 2011, which is hereby incorporated by reference herein in its entirety.

What is claimed is:

1. An image processing apparatus including a generation unit configured to generate a high dynamic range (HDR) image by combining N (N is an integer not less than three) images captured by a capturing unit with N different exposure values, the apparatus comprising:
a capturing control unit configured to cause the capturing unit to capture two images with two different exposure values;
a conversion unit configured to convert a tone characteristic of at least one of the two images; and
a generation control unit configured to cause the generation unit to combine the two images, the tone characteristic of at least one of which has been converted by said conversion unit,
wherein said conversion unit converts a tone characteristic of at least one of the two images, based on the N exposure values and the two exposure values of the two images, such that a tone characteristic of an HDR image generated from the two images is approximated to a tone characteristic of an HDR image generated from the N images.

2. The apparatus according to claim 1, further comprising a selection unit configured to select the two exposure values from the N exposure values.

3. The apparatus according to claim 1, wherein when the two exposure values are a maximum exposure value and a minimum exposure value of the N exposure values, said conversion unit converts a tone characteristic of a low-exposure image as one of the two images which exhibits a smaller exposure, so as to assign more tone values to a tone area with smaller tone values.

4. The apparatus according to claim 1, wherein when a difference between the two exposure values is smaller than a difference between a maximum exposure value and a minimum exposure value of the N exposure values, said conversion unit converts a tone characteristic of a low-exposure image as one of the two images which exhibits a smaller exposure so as to assign more tone values to a tone area with larger tone values, and converts a tone characteristic of a high-exposure image as one of the two images which exhibits a larger exposure so as to assign more tone values to a tone area with smaller tone values.

5. The apparatus according to claim 1, further comprising a designation unit configured to designate, as a target tone area of an entire tone area of an HDR image generated from the two images, one of a tone area near a center of the entire tone area and the other tone area of the entire tone area,
wherein when the tone area near the center is designated, and a difference between the two exposure values is smaller than a difference between a maximum exposure value and a minimum exposure value of the N exposure values, said conversion unit converts a tone characteristic of a low-exposure image as one of the two images which exhibits a smaller exposure so as to assign more tone values to a tone area with larger tone values, and converts a tone characteristic of a high-exposure image as one of the two images which exhibits a larger exposure so as to assign more tone values to a tone area with smaller tone values, and
when the other area is designated, and the two exposure values are a maximum exposure value and a minimum exposure value of the N exposure values, said conversion unit converts a tone characteristic of a low-exposure image as one of the two images which exhibits a smaller exposure so as to assign more tone values to a tone area with smaller tone values.

6. The apparatus according to claim 1, further comprising a suppression unit configured to suppress noise in an HDR image generated by the generation unit,
wherein said suppression unit suppresses noise more strongly when the generation unit generates an HDR image from the two images than when the generation unit generates an HDR image from the N images.

7. The apparatus according to claim 1, wherein the two images are captured by said capturing unit before capturing of the N images, combined by the generation unit, and displayed on a display unit.

8. The apparatus according to claim 1, wherein the two images are two images selected from the N images when the N images are captured, and are combined by the generation unit before the N images are combined by the generation unit.

9. The apparatus according to claim 1, wherein the conversion unit converts a tone characteristic to expand a black tone area of a low-exposure image as one of the two images or to expand a white tone area of a high-exposure image as one of the two images.

10. An image processing apparatus including a generation unit configured to generate a high dynamic range (HDR) image by combining N (N is an integer not less than three) images captured by a capturing unit with N different exposure values, the apparatus comprising:
a capturing control unit configured to cause the capturing unit to capture two images with two exposure values of the N exposure values;
a conversion unit configured to convert a tone characteristic of at least one of the two images; and
a generation control unit configured to cause the generation unit to combine the two images, the tone characteristic of at least one of which has been converted by said conversion unit,
wherein said conversion unit converts a tone characteristic of at least one of the two images such that: a tone area, of an entire tone area of an HDR image generated from the N images, which is not covered by either (a) a tone area, of a low-exposure image as one of the two images which exhibits a smaller exposure, whose tone values are not less than a first threshold, or (b) a tone area, of a high-exposure image as one of the two images which exhibits a larger exposure, whose tone values are not more than a second threshold, is assigned with more tone values than before conversion.

11. A method of controlling an image processing apparatus including a generation unit configured to generate a high dynamic range (HDR) image by combining N (N is an integer not less than three) images captured by a capturing unit with N different exposure values, the method comprising:

a capturing control step of causing the capturing unit to capture two images with two different exposure values;
a conversion step of converting a tone characteristic of at least one of the two images; and
a generation control step of causing the generation unit to combine the two images, the tone characteristic of at least one of which has been converted in the conversion step,
wherein in the conversion step, a tone characteristic of at least one of the two images is converted, based on the N exposure values and the two exposure values of the two images, such that a tone characteristic of an HDR image generated from the two images is approximated to a tone characteristic of an HDR image generated from the N images.

12. The method of controlling an image processing apparatus according to claim 11, wherein in the conversion step, a tone characteristic is converted to expand a black tone area of a low-exposure image as one of the two images or to expand a white tone area of a high-exposure image as one of the two images.

13. A method of controlling an image processing apparatus including a generation unit configured to generate a high dynamic range (HDR) image by combining N (N is an integer not less than three) images captured by a capturing unit with N different exposure values, the method comprising:
a capturing control step of causing the capturing unit to capture two images with two exposure values of the N exposure values;
a conversion step of converting a tone characteristic of at least one of the two images; and
a generation control step of causing the generation unit to combine the two images, the tone characteristic of at least one of which has been converted in the conversion step,
wherein in the conversion step, a tone characteristic of at least one of the two images is converted such that: a tone area, of an entire tone area of an HDR image generated from the N images, which is not covered by either (a) a tone area, of a low-exposure image as one of the two images which exhibits a smaller exposure, whose tone values are not less than a first threshold, or (b) a tone area, of a high-exposure image as one of the two images which exhibits a larger exposure, whose tone values are not more than a second threshold, is assigned with more tone values than before conversion.

14. A non-transitory computer-readable storage medium storing a program for causing a computer to execute the method according to claim 11.

15. A non-transitory computer-readable storage medium storing a program for causing a computer to execute the method according to claim 13.

* * * * *